(No Model.) 4 Sheets—Sheet 4.

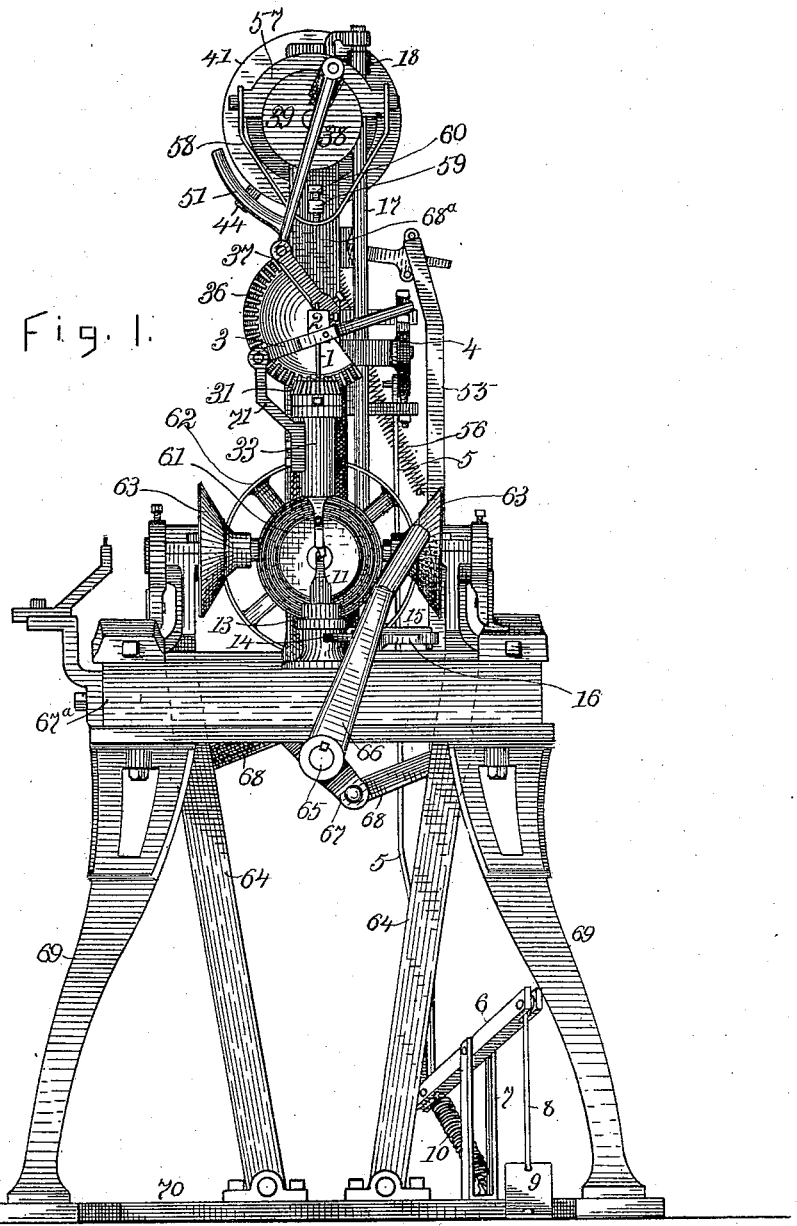

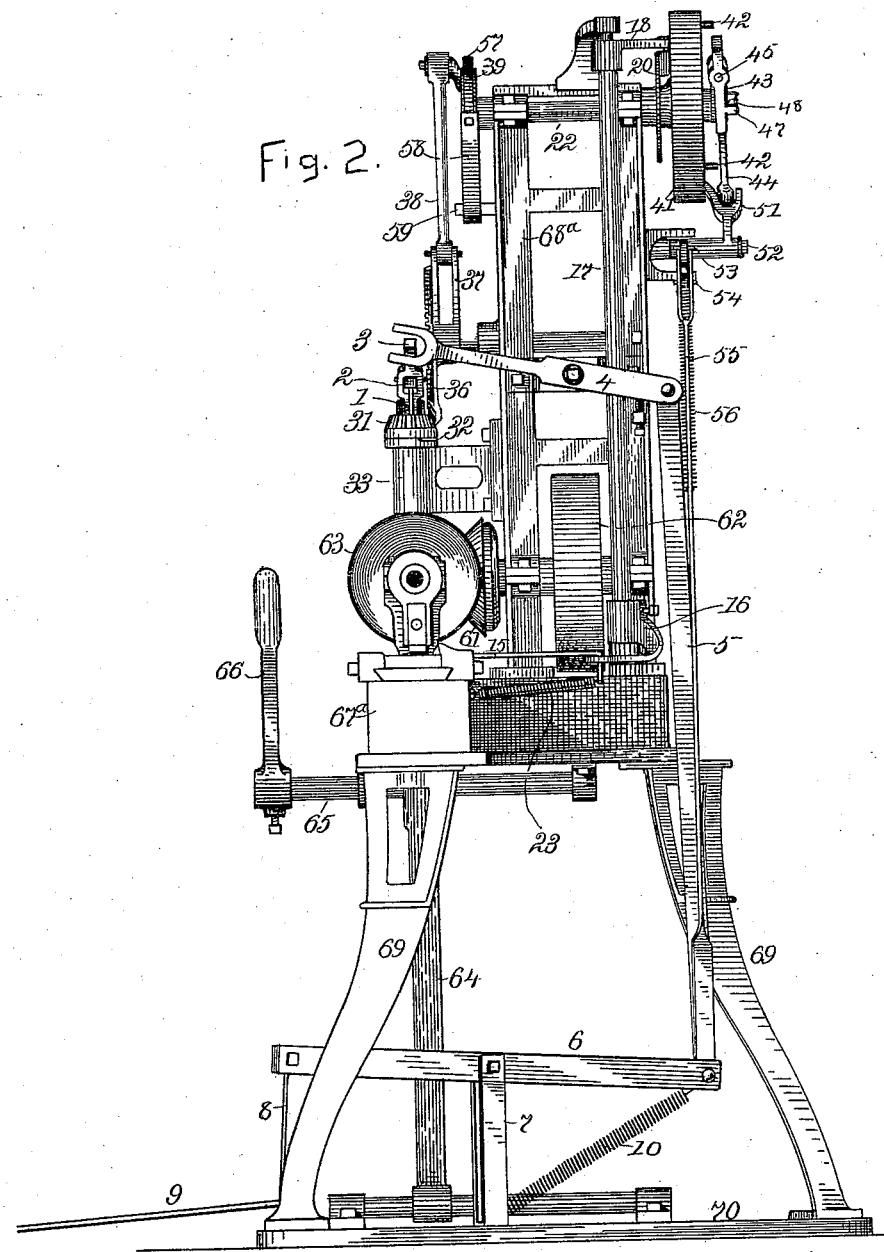

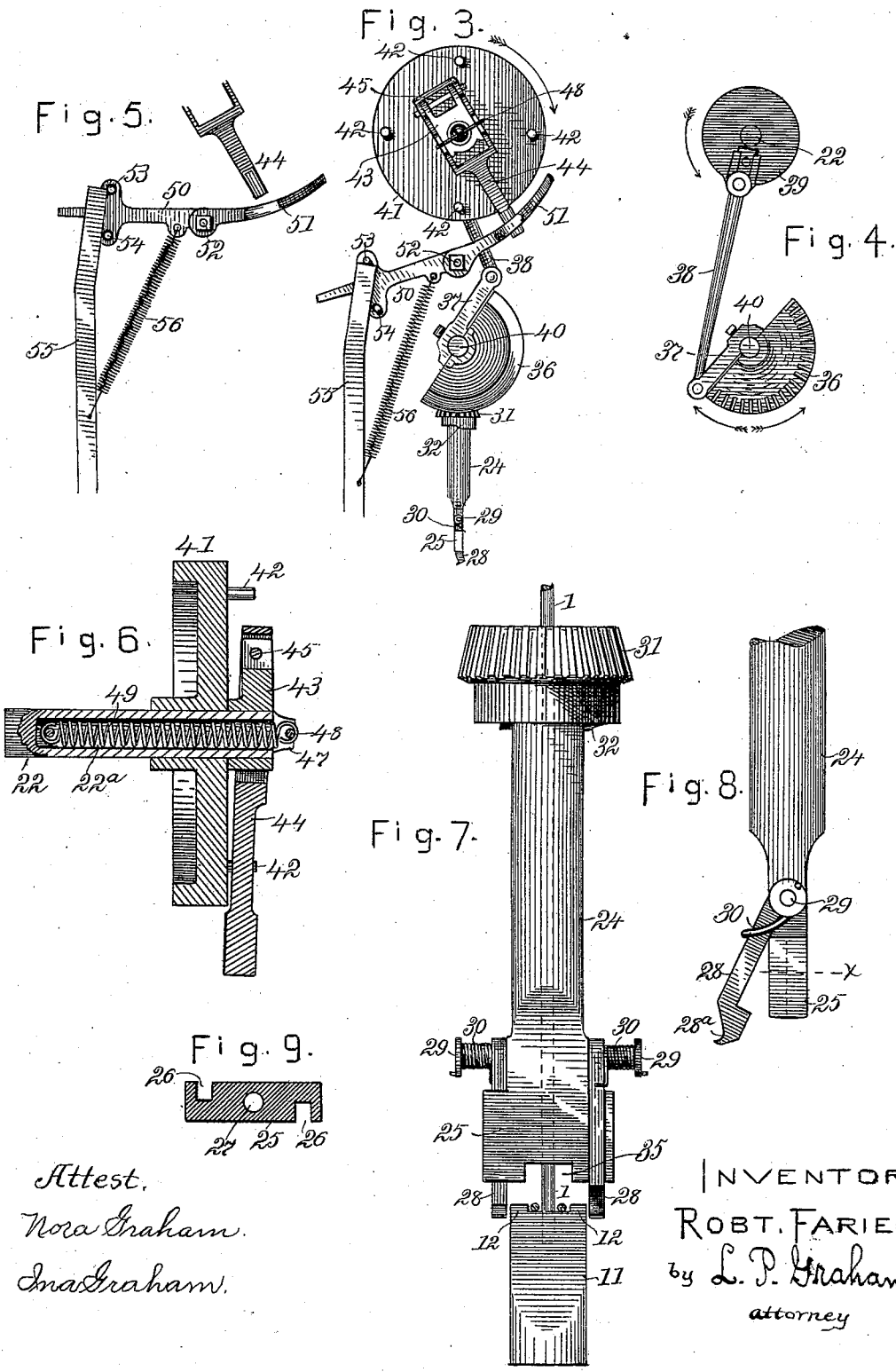

R. FARIES.
MACHINE FOR MAKING CHECK ROW WIRE.

No. 575,546. Patented Jan. 19, 1897.

Attest,
Nora Graham
Ina Graham

INVENTOR
Robt. Faries.
by L. P. Graham
attorney

UNITED STATES PATENT OFFICE.

ROBERT FARIES, OF DECATUR, ILLINOIS, ASSIGNOR TO THE FARIES MANUFACTURING COMPANY, OF SAME PLACE.

MACHINE FOR MAKING CHECK-ROW WIRE.

SPECIFICATION forming part of Letters Patent No. 575,546, dated January 19, 1897.

Application filed October 6, 1896. Serial No. 607,983. (No model.)

*To all whom it may concern:*

Be it known that I, ROBERT FARIES, of Decatur, in the county of Macon and State of Illinois, have invented certain new and useful Improvements in Machines for Making Check-Row Wire, of which the following is a specification.

The art of making commonly-used check-row wire involves two operations, that of interlocking ends of sections of wire together, and that of coiling the ends of the interlocked wires around their respective bodies, the product of the two operations being a continuous line having enlarged joints at regular intervals.

This invention relates almost entirely to means for forming interlocking eyes. It is exemplified in the structure hereinafter described, and it is defined in the appended claims.

Figure 10:
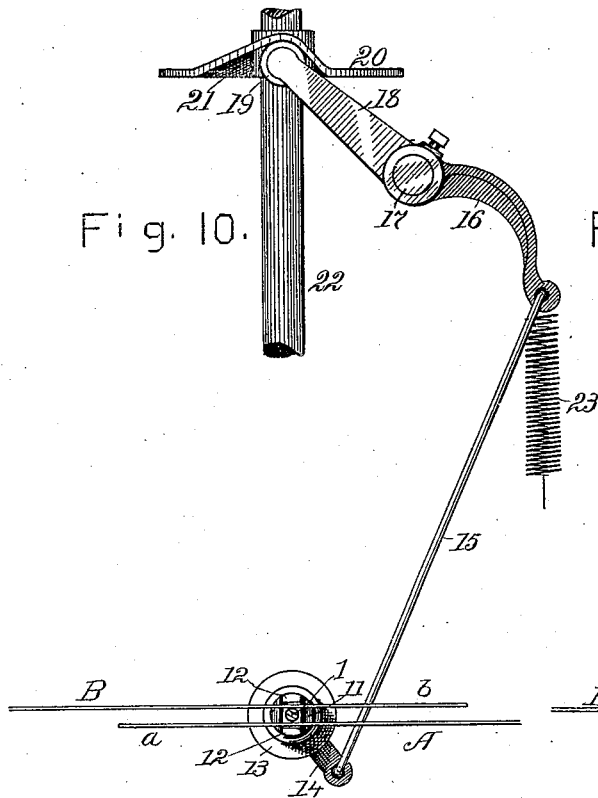
Figure 11:
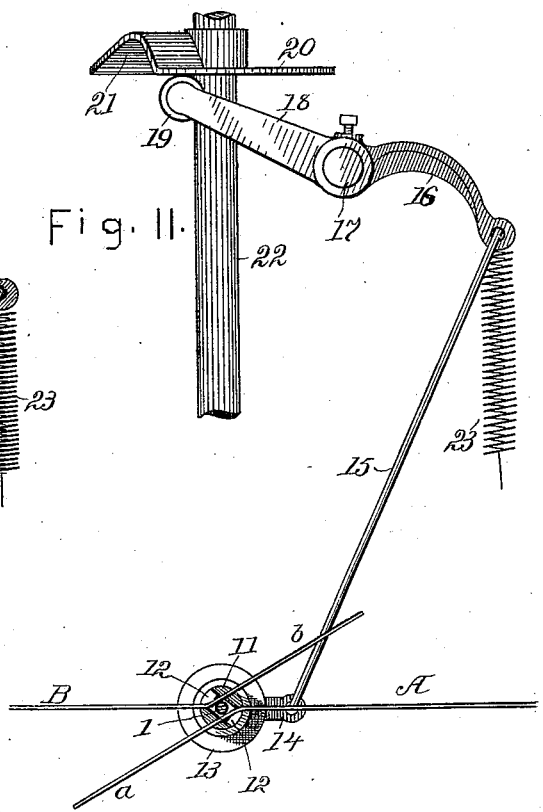
Figure 13:
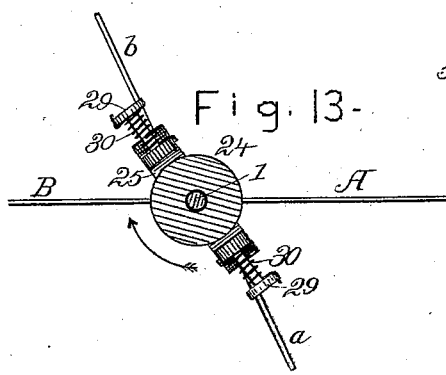
Figure 12:
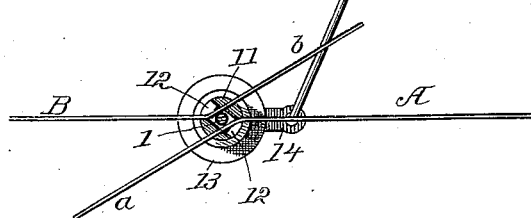
Figure 14:
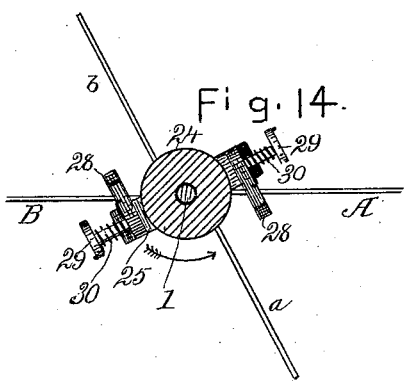

In the drawings forming part of this specification, Figure 1 is a front elevation of a machine embodying my improvements. Fig. 2 is a side elevation of the same machine. Fig. 3 is a rear elevation of certain detached details of the interlocking mechanism. Fig. 4 is a front elevation of some of the details represented in Fig. 3. Fig. 5 is a detail representation of the detent and actuating mechanism thereof used to stop and start the clutch of the interlocking device. Fig. 6 is a section through the clutch. Fig. 7 is a detached detail of the interlocking shaft and head, the rod that forms the mandrel around which the interlocks are formed, and the upper end of the kinker-shaft. Fig. 8 is a detail of the interlocking head. Fig. 9 is a cross-section on line *x* in Fig. 8. Fig. 10 is a plan illustrative of the mechanism employed to actuate the kinker-shaft and showing such shaft in its primary position. Fig. 11 is a similar plan showing the kinker-shaft in position to form preliminary bends in the ends of the wires. Fig. 12 is a detail of the interlocking mechanism, showing how the ends of the wires are carried over the bodies thereof in the act of forming an interlock. Fig. 13 is a plan of the interlocking head, showing the shaft in cross-section and illustrating the direction of rotation of the head in forming the interlocks. Fig. 14 is a similar view illustrating a back swing of the head after an interlock is made.

In building a machine in accordance with my invention a plate, as $67^a$, is supported by legs, as 69, from a base-plate 70, and a vertical frame, as $68^a$, is secured to and extended upward from plate 67. These constitute the frame of the machine as I prefer to make it, and such frame is adapted to support the different elements of my invention, and it may be modified in form and arrangement to any extent not inconsistent with its purpose.

A vertical standard 13 is fastened to the upper surface of plate $67^a$ near the front and at the longitudinal center thereof. A vertical shaft 11 is journaled in the standard. It is flattened at its upper end. It has a central bore, and two studs 12 and 12 project upward from its upper surface on opposite sides of the bore. An arm 14 connects with shaft 11 and extends through a slot in standard 13. A rod 15 connects with arm 14 and also connects at its opposite end with an arm 16, that is fixed on the lower end of shaft 17. From the upper end of shaft 17 arm 18 extends, and such arm has an antifriction-roller 19. A disk 20 is fixed on shaft 22, and it has a cam-recess 21. A spring 23 exerts a forward pull on arm 16, thereby forcing arm 18 backward and holding roller 19 against the disk. The shaft 22 is rotated intermittently in one direction by means that will be hereinafter explained, and it stops with the roller in the cam recess, as shown in Fig. 10. This permits spring 23 to force arm 14 forward, thereby carrying the kinker-shaft to such position that its studs are one in front of and the other behind the central bore. When the shaft 22 is rotated, the roller is forced out of the cam-recess, thereby rocking shaft 17 and carrying arm 14 and kinker-shaft 11 to the positions shown in Fig. 11. This movement is utilized in forming the kinks or preliminary bends, which cause the eyes of the check-row knots to be symmetrically disposed with relation to the wires, and the operation of forming the kinks is as follows:

A section of wire A is placed on top of the kinker-shaft near the front stud thereof and with its end *a* extended to the left. Another section of wire B is placed on the shaft near the rear stud with its end *b* extended to the right. A mandrel 1 is inserted into the bore of the shaft between the wires, and then when the shaft is turned, as shown in Fig. 11, the wires are kinked between the mandrel and the studs, the bodies of the wires being held in their shown positions by the coiling-heads of the machine. The kinks so formed bring the two sections of wire into alinement one with the other, and when the eyes are subsequently formed such eyes are disposed with their centers in line with the wires, thereby providing for properly-balanced knots. In addition to forming the preliminary bends the studs of shaft 11 clamp the wires against the mandrel and hold them against longitudinal motion while the interlocks are formed.

The rod 1, which forms the mandrel around which the wires are bent, extends through a central bore in the shaft and head that form the interlocks. It is fastened at its upper end in a block 2 in a manner permitting longitudinal adjustment. The block is pivoted in an arm 3, that is swung at one end in a bracket 71. A forked lever 4 engages the swinging end of arm 3, and a bar 5 connects lever 4 with a lever 6, that is pivoted under the bed of the machine in uprights 7. A spring 10 tends to hold the back end of lever 6 depressed, thereby elevating the mandrel-rod through the instrumentalities just enumerated, and treadle 9, which is connected with the front end of lever 6 by means of rod 8, provides convenient means for depressing the front end of lever 6 and thereby lowering the mandrel into an operative position. The mandrel-rod is lowered by foot-pressure into the bore of the kinker-shaft as a preliminary step in forming interlocking eyes, and it is raised by spring-pressure after each of such interlocking operations in order to permit the completed knot to be withdrawn from the machine.

A bracket 33 is fastened to frame 68 above standard 13. It has a vertical bore in line with kinker-shaft 11, and it has a cam-collar 34 encircling the upper end of the bore. Twister-shaft 24 journals in bracket 33. A gear-pinion 31 is fixed on the upper end of the shaft, and below the pinion is a cam-collar 32, that rests on and corresponds with the cam-surface 34. The opposing cam-surfaces have vertical deflection amounting to an eighth of an inch or so, and as the shaft is rocked to and fro in the operation of forming interlocking eyes it is alternately raised and lowered to an extent equaling the deflection of the cam-surfaces. The lower end of the twister-shaft is widened and flattened to form head 25. The head is grooved vertically at diagonally opposite points, as shown at 26 in Fig. 9, and the shaft and the head have the central bore 27, through which the mandrel-rod extends. Pins 29 extend laterally one from each side of the head. Fingers 28 are pivoted one on each of the pins in line with a groove, and their ends extend below the lower end of the head. Springs 30 are wound around pins 29 and connected therewith, and they bear against the fingers in directions tending to hold the fingers in the grooves of the head. The twister-head is so located with reference to the kinker-shaft 11 that the fingers terminate a short distance below the upper end of the shaft, and the lower ends of the fingers are slightly hooked or concaved in their front faces, as shown at $28^a$ in Fig. 8, in order that they may better engage the wires. In the operation of the machine the twister-head is always close to the kinker-shaft, and to provide for removal of the completed knots the central portion of the under surface of the head is recessed or cut away, as shown at 35 in Fig. 7.

While the wires are being arranged in position in the machine and the preliminary bends or kinks are being made, the twister-head stands with its thin edges presented front and back, and after an interlock has been formed it also stands in this position while the coils that convert the interlocked eyes into a check-row knot are being formed. After the kinks are made, as shown in Fig. 11, the twister-head is given a partial rotation in the direction indicated by the arrow in Fig. 13, the downward-extended ends of the fingers engage the ends of the wires, the cam-surfaces 32 and 34 raise the head enough to carry the ends of the wires over the body portions, as shown in Fig. 12, and when the head has been given something less than one complete rotation and the ends of the wires are carried to about the relative positions shown in Figs. 13 and 14 the direction of the rotation of the shaft is reversed and the head is swung back to its original position. As the head rocks backward, as illustrated in Fig. 14, the fingers swing backward against pressure of the springs and ride over the wires that lie in their paths; but as soon as the primary position of the head is regained the springs return the fingers to their respective grooves preparatory to another operation. The grooves tend to hold the fingers against either back or side motion while the head is forming interlocks, but the indispensable feature in this connection is that the heads shall have bearings behind the fingers that will perform the function of holding the fingers rigid with the head while the head is rotating forward or in an operative direction.

The means employed to rock the twister-head back and forth consists, in this particular instance, of a rocking segment of gear-wheel 36, that meshes with pinion 31, though it is evident that a reciprocating rack might readily be substituted for such segment of gear-wheel, so far as the idea of imparting back-and-forth motion to the twister-shaft is broadly considered. The segment of gear-wheel is mounted on shaft 40, as is also rock-arm 37. A crank-wheel 39 is fixed on drive-shaft 22 and a pitman-rod 38 connects the crank-wheel with rock-arm 37. Between operations of the twister-head the crank-wheel stands with its crank elevated, as shown in Fig. 1, and each operative motion of shaft 22 consists of a complete rotation that rocks the segment of gear-wheel to the position shown in Fig. 4 and then returns it to the position shown in Fig. 1, thereby giving the required back-and-forth motion to the twister-head.

To provide for rotating the crank-wheel intermittently, a pulley 41 is journaled loosely on shaft 22 and is provided on its rear face with a set of pins that act as ratchet-teeth. A block or bracket 43 is fastened onto the end of shaft 22 adjacent to the rear face of the pulley. A pawl 44 fits around the bracket 43 and is connected therewith by means of pivot-pin 45. Lugs 47 (seen best in Fig. 6) extend rearward from the pawl on opposite sides of the end of shaft 22. A rod 48 lies against the lugs, and a spring 49 engages the rod and tends to draw the free end of the pawl toward the pulley. To provide space for the spring, the rear end of the shaft 22 is longitudinally recessed, as shown at 22ª in Fig. 6, and the spring is inserted therein and connected with a pin that extends transversely through the shaft. The free end of the pawl extends beyond the periphery of the pulley, and it rests, when not in operation, in the crotch 51 of a forked detent 50 and is held by such detent out of contact with the pins 42 of the pulley. The member of the fork of pawl 50 nearest the pulley is inclined, as shown in Fig. 2, and it extends toward the front of the machine slightly past the rear face of the pulley. The detent pivots at 52 on a shaft extended rearward from frame 68, and it has an arm that is provided with two laterally-extending pins 53 and 54, one higher than the other. A bar 55 extends upward from a foot-lever under the bed of the machine, in this instance lever 6, and its upper end stands normally under the upper pin 53 of the detent-arm, while one of its edges bears against the lower pin. A spring 56 connects with the arm of the detent and with bar 55, and it draws the bar toward pin 54 and pulls down on the arm of the detent. The pulley 41 is driven continuously in the direction indicated by the arrow in Fig. 3, and so long as the pawl is in the crotch of the detent the rotation of the pulley is ineffective. When in the operation of the machine the time for making the interlock arrives, the detent is swung out of engagement with the pawl, as shown in Fig. 5, the spring 49 draws the free end of the pawl against the rear face of the pulley, and a pin 42 engages the pawl after the manner of a ratchet-tooth and rotates the shaft and the crank-wheel, thereby imparting operative motion to the twister-head. By the time the pulley is finishing a complete rotation the detent has been returned to the position shown in Fig. 3 and the inclined member of the fork draws the pawl from contact with the pin of the pulley and into the crotch of the detent, where it is brought to a stop.

To make it certain that the detent will be in position to arrest the pawl when the pulley has made a rotation, it is provided that the same motion that disengages the detent will also permit it to be drawn back to its stopping position by a spring. This provision comprises the pins 53 and 54, the bar 55, and the spring 56, and the operation thereof is as follows: When foot-pressure is applied to the front end of the lever 6, the bar presses upward against pin 53 and moves the detent until the pawl is released, at which time pin 54 will force the bar out of contact with pin 53. This permits the bar to make further upward motion or to remain elevated without interfering with the return motion of the detent under stress of spring 56. This provision also enables the one foot-lever to be used for actuating the mandrel and for tripping the detent, though the times of action in the two cases are not coextensive, and the mandrel must remain depressed much longer than the detent is swung away from the pulley.

To avoid excessive jar in stopping the pawl when the machine is run rapidly, a friction brake or retarder may be applied to the crank-wheel or to some other rotating member of this part of the machine. In this instance a shoe 57 is made to engage a groove in the periphery of the crank-wheel. A strap 58 connects with the ends of the shoe and passes under a rigid projection 59, that extends outward from frame 68, and a set-screw 60 in projection 59 bears against the strap and provides means for increasing or diminishing the pressure of the shoe against the crank-wheel.

Check-row knots are made out of the interlocking eyes by coiling the ends of the wires around their body portions, and so far as this invention is concerned it is immaterial what mechanism is used to perform the coiling operations; but the coiling mechanism I prefer to use in connection with my improved interlocking mechanism is that described in Letters Patent of the United States No. 516,526, granted to me March 13, 1894. Such coiling mechanism is shown in the drawings of this specification, and it consists, generally speaking, of a friction-wheel 61, that is mounted on the shaft of a belt-pulley 62, coiling-wheels 63, carried on the swinging ends of rock-bars 64, a shaft 65, having a handle 66, a cross-arm 67 on shaft 65, and stiff links 68, connecting the cross-arm with the rock-bars. When an interlock is completed, the kinker-shaft and the twister-head are left in the positions shown in Fig. 1, the bodies of the wires extend one through each coiling-wheel, and the ends of the wires lie substantially as shown in Fig. 14. The handle 66 is then swung to the right, bringing the coiling-wheels against the drive-wheel 61 and their notched ends in engagement with the ends of the wires, and the said ends are coiled around their respective bodies in the customary manner. When a knot is completed, it is passed from the machine through one of the coiling-wheels in the usual manner, except that the twister-head is not raised preparatory to such removal.

The wire used in making the interlocking eyes is about one-tenth of an inch in diameter, and a lift of an eighth of an inch in the twister-head is sufficient to carry the ends over the bodies. These measurements are not arbitrary, but proportionate only, the lift of the twister-head by the cam-surfaces being slightly greater than the diameter of the wire used, whatever that may be.

What I claim as new, and desire to secure by Letters Patent, is—

1. In a machine for forming interlocking eyes, the combination of a mandrel, a twister-head journaled in bearings that permit rotary motion and preclude all but a slight degree of endwise motion, and means for rocking the twister-head back and forth.

2. In a machine for forming interlocking eyes, the combination of a mandrel, a twister-head, a pair of twister-fingers pivoted one to each side of the head, and bearings on the head against which the fingers rest while the head is turned forward and from which they may swing when the head is turned backward.

3. In a machine for forming interlocking eyes, the combination of a mandrel, a twister-head, a pair of fingers pivoted one to each side of the head, bearings on the head against which the fingers rest while the head is turned forward and from which they may swing when the head is turned backward, and springs tending to hold the fingers against the bearings.

4. In a machine for making check-row wire, the combination of a mandrel, a support for the wires, and a twister-head journaled above the support for the wires, held constantly in operative relation thereto, and having the central part of its under surface recessed, or cut away, to permit passage of completed knots.

5. In a machine for making check-row wire, the combination of a wire-support having a vertical bore, an axially-bored twister-head journaled above the support and held constantly in operative relation thereto, and a reciprocating mandrel in the head adapted to penetrate the bore of the wire-support, whereby interlocks may be formed by rocking the head back and forth and the knots may be withdrawn when the mandrel is raised.

6. In a machine for forming interlocking eyes, the combination of a shaft having a twister-head on one end and a pinion on the other end, wire-engaging fingers pivoted on the head, and reciprocating gear in mesh with the pinion.

7. In a machine for forming interlocking eyes, the combination of a shaft having a twister-head on its lower end and a pinion on its upper end, a bearing for the shaft having a cam-surface adapted to slightly raise and depress the head as the shaft is moved back and forth on its axis, and reciprocating gear for rocking the pinion.

8. A twister-head for a machine for forming interlocking eyes, such head having central bore 27, side grooves 26, pivot-pins 29, fingers 28 pivoted on pins 29 and resting normally in the grooves, and springs 30 tending to press the fingers into the grooves.

9. In a machine for forming interlocking eyes, the combination of a mandrel, a twister-head having a drive-pinion, reciprocating mechanism adapted to rock the pinion, and an automatically-detachable clutch for stopping the reciprocating gear after each back-and-forth operative motion.

10. In a machine for forming interlocking eyes, the combination of a mandrel, a twister-head, a pinion on the shaft of the twister-head, a rocking segment of gear-wheel in mesh with the pinion, a crank-shaft, a pitman connecting the crank of the shaft with the segment of gear-wheel, a continuously-rotating pulley journaled loosely on the crank-shaft and supplied with ratchet pins or teeth, a pawl on the crank-shaft resting normally in engagement with the pins of the pulley, and a detent having an incline in the path of the pawl, whereby the pawl is disengaged from the pulley when the detent is encountered.

11. In a machine for forming interlocking eyes, the combination of a drive-shaft for the interlocking mechanism, such shaft having a longitudinal recess, a continuously-rotating pulley journaled loosely on the shaft and equipped with ratchet pins or teeth, a bracket fixed on the shaft adjacent to the pulley, a pawl pivotally connected with the bracket and adapted to engage the pins of the pulley, a spring in the recess of the pulley-shaft tending to draw the pawl toward the pulley, and a detent having an incline normally in the path of the pawl.

12. In a machine for forming interlocking eyes, the combination of a drive-shaft for the interlocking mechanism, a continuously-rotating pulley journaled loosely on the shaft, such pulley having ratchet pins or teeth, a pawl on the shaft normally engaging the pins of the pulley, a detent for the pawl, an arm for the detent having two pins extending laterally from its swinging end in different radial lines, a trip-bar having tangential motion with relation to the swing of the arm, the end of such bar resting normally against one of the pins of the arm and an edge thereof against the other pin, and a spring tending to draw the bar toward the pivot of the arm.

13. In a machine for forming interlocking eyes, the combination of an axially-bored kinker-shaft adapted to be rocked axially and having studs on opposite sides of the bore, an axially-bored twister-head journaled in constant operative relation to the kinker-shaft and having the central part of its surface nearest the kinker-shaft cut away, and a reciprocating mandrel in the head adapted to penetrate the bore of the kinker-shaft.

14. In a machine for forming interlocking eyes, the combination of a kinker-shaft having a central mandrel and studs on opposite sides thereof, an arm connecting with the kinker-shaft, a cam adapted to rock the arm, and a drive-wheel connected with the cam through clutch mechanism, whereby the kinker-shaft may be rocked back and forth at intervals.

15. In a machine for forming interlocking eyes, instrumentalities in combination as follows: an axially-rocking kinker-shaft, an axially-bored and axially-rocking twister-head, actuating mechanism for the kinker-shaft and the twister-head, one element of which is an automatically-detachable clutch, a mandrel-rod longitudinally movable in the twister-head, a lever adapted to raise and lower the mandrel-rod, and a clutch-shifter connected with the lever of the mandrel-rod, whereby the act of lowering the mandrel to an operative position starts the drive mechanism of the kinker-shaft and twister-head.

16. In a machine for forming interlocking eyes, the combination of interlocking mechanism, driving mechanism including a clutch, an automatic throw-out and stop for the clutch, a friction-wheel in the drive mechanism between the clutch and the interlocking mechanism, a shoe on the friction-wheel, and means for regulating the pressure of the shoe on the wheel, whereby the jar incident to stopping the clutch and the interlocking mechanism may be controlled.

In testimony whereof I sign my name in the presence of two subscribing witnesses.

ROBERT FARIES.

Attest:
L. P. GRAHAM,
L. H. SHELLEY.